United States Patent
Tanaka et al.

(10) Patent No.: US 6,256,509 B1
(45) Date of Patent: Jul. 3, 2001

(54) BROADCAST INFORMATION DELIVERING SYSTEM

(75) Inventors: Satoshi Tanaka, Kokubunji; Eiichi Amada, Setagaya-ku; Seiki Mizutani, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/268,649

(22) Filed: Mar. 16, 1999

(30) Foreign Application Priority Data

Mar. 19, 1998 (JP) .................................................. 10-069729

(51) Int. Cl.⁷ .................................................. H04B 7/005
(52) U.S. Cl. .......................... 455/515; 455/434; 455/458; 370/336; 370/349
(58) Field of Search .................................. 455/434, 151, 455/179, 511, 515, 150.1, 181.1, 466, 458, 517, 524; 370/336, 337, 345, 347, 349

(56) References Cited

U.S. PATENT DOCUMENTS

| | | | | |
|---|---|---|---|---|
| 6,044,069 | * | 3/2000 | Wan | 370/311 |
| 6,046,990 | * | 4/2000 | Chennakeshu et al. | 370/317 |
| 6,061,718 | * | 5/2000 | Nelson | 709/206 |
| 6,064,889 | * | 5/2000 | Fehnel | 455/511 |
| 6,075,779 | * | 5/2000 | Agarwal et al. | 370/337 |
| 6,094,429 | * | 7/2000 | Blanchette et al. | 370/347 |
| 6,101,383 | * | 8/2000 | Poon | 455/425 |
| 6,111,867 | * | 8/2000 | Mann et al. | 370/337 |
| 6,115,366 | * | 9/2000 | Campanella et al. | 370/319 |

FOREIGN PATENT DOCUMENTS 9475886   5/1995   (AU) .

* cited by examiner

*Primary Examiner*—William G. Trost
*Assistant Examiner*—Congvan Tran
(74) *Attorney, Agent, or Firm*—Antonelli, Terry, Stout & Kraus, LLP (57) ABSTRACT

A broadcast information delivering system which includes a plurality of wireless terminals and a wireless base station having a transmitter for transmitting broadcast control information to a control channel, and a transmitter for transmitting a broadcast frame to a broadcast channel in accordance with a transmission condition defined in the broadcast control information. The broadcast frame includes a plurality of sub-frames containing different contents information to each other and a frame header including guidance information of the contents information. Each of the wireless terminals includes a receiver for receiving the control information from the control channel, and a receiver for receiving the broadcast frame from the broadcast channel based on the broadcast control information and selectively receiving the contents information in a specific one of said sub-frames in accordance with the guidance information of the broadcast frame.

11 Claims, 9 Drawing Sheets

TBL1 : 400

| 401 | 402 | 403 | 404 | 405 | 406 | 407 |
|---|---|---|---|---|---|---|
| CONTENTS ID | TITLE OF CONTENTS | START TIME OF CONTENTS BROADCAST | CHARGED /FREE | CHARGING RULE | VERSION ID | DATA LENGTH |
|  |  |  |  |  |  |  |

FIG. 11

TBL2 : 500

| 501 | 502 | 503 | 504 | 505 | 506 | 507 | 508 |
|---|---|---|---|---|---|---|---|
| RESERVATION NO. | CONTENTS ID | CHARGED /FREE | VERSION ID | FILE POINTER | COMPLETION | DECIPHER KEY | TERM OF VALIDITY |
|  |  |  |  |  |  |  |  |

BROADCAST INFORMATION DELIVERING SYSTEM

BACKGROUND OF THE INVENTION (1) Field of the Invention

The present invention relates to a broadcast information delivering system, and more specifically to a broadcast information delivering system in which broadcast information is transmitted from a base station of a wireless communication system, and information reserved by a user is automatically collected at the wireless terminals.

(2) Description of the Related Art

In a computer network using a communication circuit, a user sets up an individual bidirectional circuit between a user terminal and a destination apparatus, whereby the user is able to obtain necessary information from a desired information site. For example, if the bidirectional circuit is set up between the user terminal apparatus and an Internet connection apparatus, desired information can be taken out from an arbitrary WEB and displayed on the terminal apparatus.

However, in order to access a desired information provider system in the conventional communication network, each terminal user is required to perform a complicated communication procedure for setting up a communication circuit between the terminal apparatus and the information provider system, and the user takes a considerably long time to obtain desired information. The transmission of information from the information provider system to the terminal apparatus is carried out through a dedicated communication channel established at each user terminal, and accordingly the communication charge to acquire desired information becomes high.

These problems mentioned above become apparent specially in case that a terminal apparatus of a wireless communication system such as a mobile phone or PHS (Personal Handyphone System) accesses the information provider system through a wireless channel.

Here, as an information notification system that broadcasts to an unspecified number of car radios reporting information such as traffic information to present the congestion of a road, for example, the Japanese Unexamined Patent Publication No. Hei 10-22951 has disclosed a system construction, in which a transmitter repeatedly broadcasts by applying the frequency conversion to the reporting information of plural groups each including an ID header for indicating the IDs of the kind of information, information data divided into a plurality of information elements, and EOF, and a receiver stores all the received information groups in a memory, reads out from the memory an information group of a specified ID selected by a user on the operation panel, applies the reverse frequency conversion to the information, and outputs the original information to the speaker, whereby the user is able to obtain the reporting information without relation to the broadcasting hours.

SUMMARY OF THE INVENTION

An object of the invention is to provide a broadcast information delivering system and a wireless communication system that can provide information requested by a user inexpensively with a simple procedure.

Another object of the invention is to provide a broadcast information delivering system and a wireless communication system that can effectively deliver information requested by a user at a mobile station operated by a battery with the least exhaustion of the battery.

Another object of the invention is to provide a broadcast information delivering system and a wireless communication system that a terminal user can refer to desired information at a timing convenient to the user.

Another object of the invention is to provide a broadcast information delivering system and a wireless communication system that is well adapted for charge for charged information.

Another object of the invention is to provide a wireless base station that can effectively deliver information to a plurality of user terminals, and a wireless terminal apparatus that can effectively receive information desired by a user.

In order to accomplish the foregoing objects, the broadcast information delivering system of this invention employs a wireless base station that communicates system control information through at least one control channel and user information through a traffic channel allocated to each of the wireless terminals, with a plurality of wireless terminals.

The wireless base station employed in this invention is characterized by comprising: a control channel transmitter circuit for transmitting to the control channel the system control information, and broadcast control information that defines a transmission condition concerning a broadcast frame; and a broadcast channel transmitter circuit for transmitting the broadcast frame containing broadcast information to be received by unspecified wireless terminals to a specific channel defined by the broadcast control information, in accordance with the transmission condition.

In case of the cellular system using the CDMA (Code Division Multiple Access) technique, for example, a radio channel can be specified by a spreading code used in a spread spectrum of transmission information. A transmission signal having been applied code spreading by a transmitter based on a certain spreading code can be received only when a receiver applies the despreading to the received signal by using the same spreading code. Accordingly, if the wireless base station is able to beforehand inform each of the terminals of channel information such as the spreading code used in a broadcast channel and the transmission rate, all the terminals will be able to receive the transmission information of the broadcast channel.

According to this invention, by transmitting the broadcast control information to the control channel, each of the terminals is informed of the channel information concerning the broadcast channel, so that all the terminals located within a base station cell can receive the broadcast information.

Further, according to this invention, transmission of the broadcast information from the wireless base stations can be realized by utilizing the infrastructure of the existing wireless communication system such as the cellular system, it becomes possible to deliver to the wireless terminals local broadcast information unique to each area, depending upon the covering area of the respective wireless base stations.

According to the present invention, the wireless base station can transmit the broadcast frame having the same contents periodically for a plurality of times, and each of the wireless terminals can receive again at the subsequent broadcast frame the same broadcast information that has been failed in normal receiving at the previous broadcast frame due to transmission errors, resulting in allowing highly reliable information delivery.

Another aspect of the invention resides in that the broadcast control information includes information for indicating a transmission time of the broadcast frame in addition to information for specifying the broadcast channel or a spreading code, and each broadcast frame is comprised of a plurality of sub-frames which contain different broadcast information to each other and a frame header which includes guidance information of the contents of said broadcast information contained in the respective sub-frames. Each of the sub-frames is comprised of, for example, a plurality of information packets each including a sub-frame header and a block of broadcast information.

Each of the wireless terminals for use in the broadcast information delivering system of the present invention is characterized by comprising a control channel receiver circuit for receiving the control information from the control channel, a broadcast channel receiver circuit for receiving the frame header of a broadcast frame from the broadcast channel on the basis of the broadcast control information received by the control channel receiver circuit and selectively receives broadcast information contained in a specific sub-frame of the broadcast frame in accordance with guidance information indicated by the broadcast frame header, a storage for storing the broadcast information received by the broadcast channel receiver circuit, and an output device for outputting the broadcast information stored in the foregoing storage.

Another aspect of the invention resides in that the frame header includes index data of the broadcast information contained in the respective sub-frames, for example, the title or classification of contents and time information for indicating a transmission timing of each of the sub-frames, and each of the wireless terminals comprises an input device for designating reserved broadcast information to be received, and a power supply controller for halting the power supply to the broadcast cannel receiver circuit for a period after receiving the frame header of the broadcast frame until the transmission timing of a target sub-frame containing specific broadcast information reserved by a user.

As mentioned above, by giving an advance announcement of the transmission time of the broadcast frame at the control channel, each terminal can halt the broadcast channel receiver circuit until the leading part of the subsequent broadcast frame comes in. Further, by storing an identifier of the broadcast information reserved by a user, each terminal according to the present invention can confirm the transmission timing of the reserved broadcast information when the header of the broadcast frame was received. Therefore, the terminal is able to temporarily halt the broadcast channel receiver circuit upon completing the receiving of the frame header, and activate the broadcast channel receiver circuit again at the transmission timing of the target sub-frame including the reserved broadcast information, thereby to reducing exhaustion of the battery.

Further, the wireless terminal according to the invention is characterized by a communication means for automatically communicating with the broadcast information delivering system, when the reserved broadcast information received by the broadcast channel receiver circuit is enciphered, to obtain a decipher key necessary to decipher the enciphered broadcast information.

In the broadcast information delivering system which transmit broadcast information to a number of unspecified user terminals via a common channel such as the broadcast channel, how to charge the information utility fee to the respective users becomes a problem. According to the present invention, the above problem is overcome by enciphering the charged information and by distributing a decipher key from a information provider to each user terminal through a bidirectional channel other than the broadcast channel, whereby the information provider charges the user terminal for the utility fee of the decipher key upon the completion of delivering of the decipher key.

DESCRIPTION OF THE PREFERRED EMBODIMENTS

Figure 1:
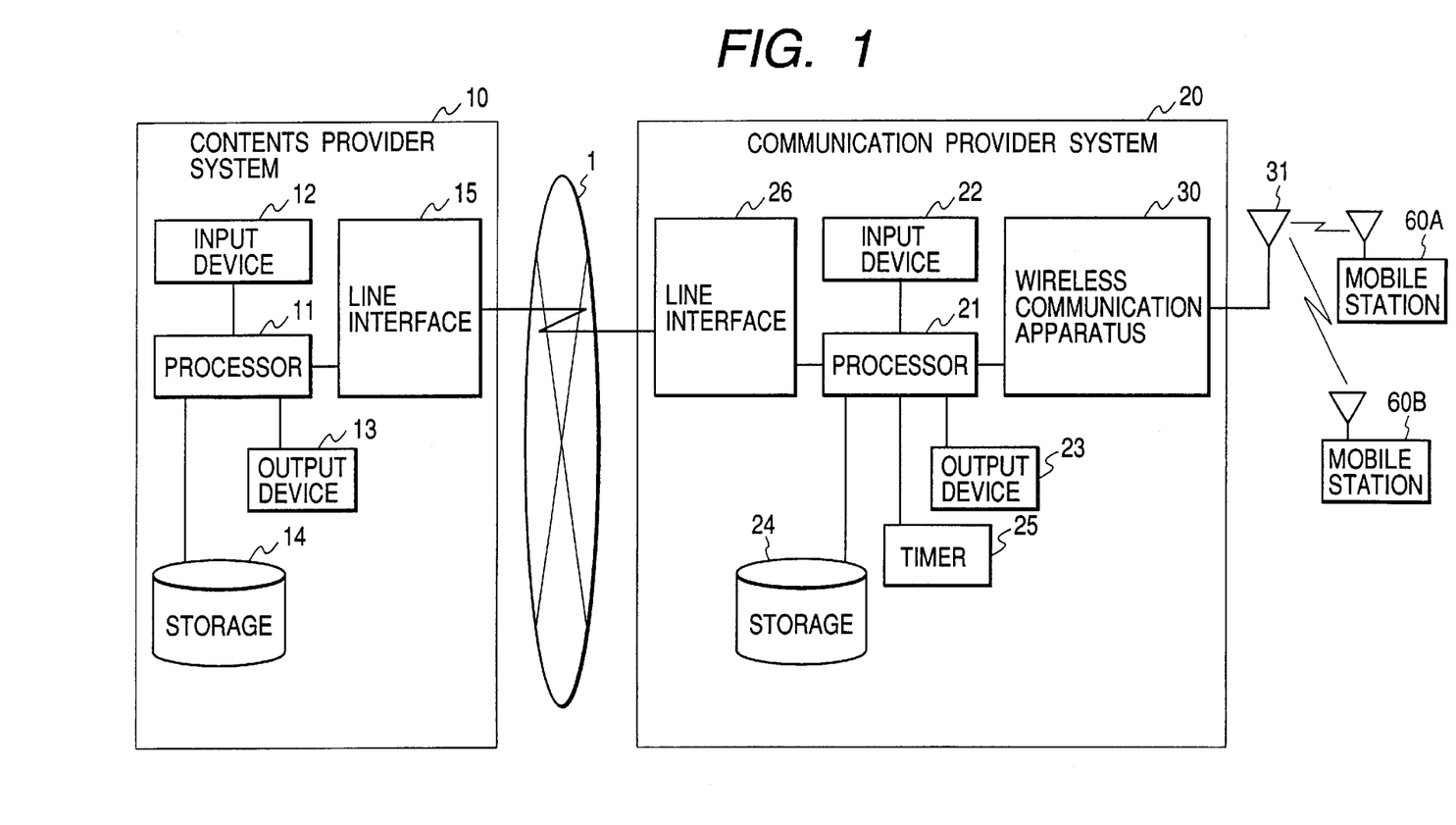
FIG. 1 is a block diagram illustrating a whole construction of a broadcast information delivering system according to the invention.

FIG. 1 illustrates a whole construction of a broadcast information delivering system according to the invention.

In FIG. 1, 10 denotes a contents provider system for generating various contents served as broadcast information, 20 a communication provider system (broadcast information provider system) connected to the contents provider system 10 through a communication network 1 of a public network or a dedicated line. The communication provider system 20 transmits broadcast information received from the contents provider system 10 to a plurality of user terminals, for example, mobile stations MS 60 (60A to 60N) through a wireless communication apparatus 30.

The broadcast information delivering system of the invention delivers the broadcast information by utilizing an existing wireless communication system such as a cellular system, and the communication provider system 20 is incorporated into a wireless base station BS constituting a cell wireless communication system. In FIG. 1, only one communication provider system 20 is illustrated, however in practice, the broadcast information edited by the contents provider system 10 is distributed to a number of the wireless base stations BS through the communication network 1 and a mobile switching center and a base station controllers constituting a part of the communication network 1. The broadcast information is stored in a storage 24 of the communication provider system 20 incorporated in each of the wireless base stations BS, and is broadcast to the wireless terminals (mobile station MS) 60 through the wireless communication apparatus 30 of the wireless base station BS.

The contents provider system 10 employs an input device 12 connected to a processor 11 and an output device 13 such as a display to thereby execute the input and editing operation of the contents to be broadcast. The edited contents information is temporarily stored in the storage 14, thereafter is transmitted to the communication circuit 1 through a line interface 15, and is supplied to each communication provider system 20.

Each communication provider system (wireless base station BS) 20 receives the contents information transmitted from the contents provider system 10 by a line interface 26 and stores it in a storage 24. The contents information stored in the storage 24 is transmitted as broadcast information from an antenna 31 of the wireless communication apparatus 30 in accordance with a specific broadcasting schedule controlled based on a timer 25. The contents information stored in the storage 24 may be output to an output device 23 in response to operator inputs from an input device 22, where the operator checks and edits the contents information if necessary.

In the broadcast information delivering system of this embodiment, one of downlink traffic channels toward the mobile station 60 from the cellular wireless base station BS is employed as a broadcast channel, and the broadcast information is transmitted through this broadcast channel. Accordingly, a single physical channel can distribute the broadcast information simultaneously to an unspecified number of wireless terminals.

Although the broadcast information service has been examined in the third generation mobile communication system, any structural proposal about the service has not been materialized. The broadcast information delivering system of the invention utilizes the property of the wireless communication system that all the terminals can available all the channels physically, and further expands the packet communication in the present state. Thereby, the system of this embodiment enables to effectively distribute the broadcast contents information having a comparatively large amount of information to a great number of users.

As the wireless terminal 60 used by an end user, the existing mobile stations constituting a part of the wireless communication system such as the cellular system are applicable by adding the following functions for receiving broadcast information transmitted through the broadcast channel, reserving an identifier of the contents that the end user desires, selectively receiving the reserved contents out of the broadcast information, storing the received information in the storage, and outputting the stored contents in response to a request from the end user.

In the broadcast information delivering system of this embodiment, various kinds of contents information each having a comparatively large amount of information are broadcast by one broadcast frame, as will be described later. The same broadcast frame is transmitted repeatedly from the base station BS. However, since the amount of broadcast information is great, the repetition period of the broadcast frame becomes comparatively long.

Figure 2:
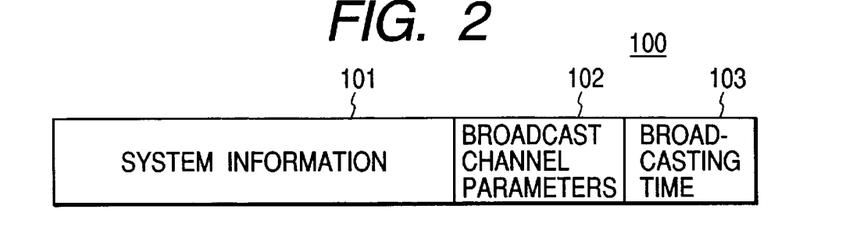
FIG. 2 is a chart illustrating an example of a format of a control frame transmitted from a base station.

FIG. 2 illustrates a format of a control frame transmitted from each base station BS, in this embodiment.

A control frame 100 includes, in addition to system information 101 to be transmitted from a base station to mobile stations in a conventional wireless communication system, broadcast control information indicating a broadcast channel parameter 102 for specifying a broadcast channel and a transmission time (hereinafter, called as broadcast time) 103 of the subsequent broadcast frame, as control information specific to this invention,.

Figure 3:
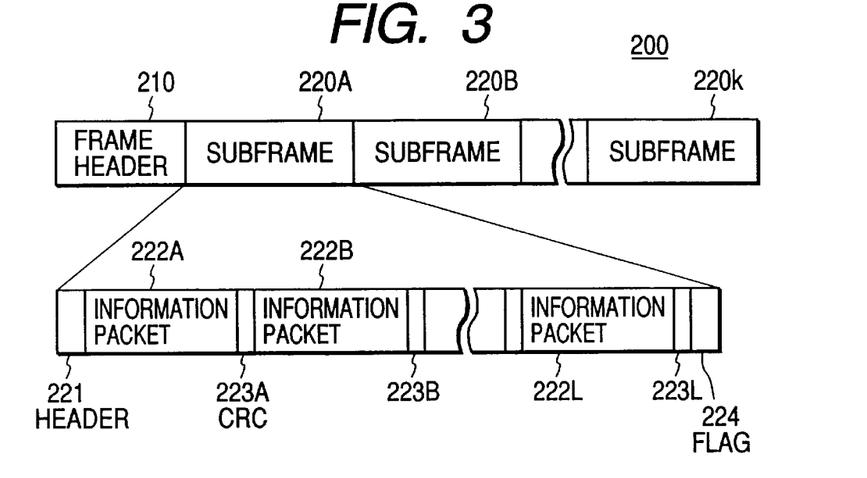
FIG. 3 is a chart illustrating an example of a format of a broadcast frame transmitted from a base station.

FIG. 3 illustrates the format of a broadcast frame 200. The transmission of the broadcast frame 200 is started at the transmission time 103 in a downlink channel (hereinafter, called as broadcast channel) specified by the broadcast channel parameters 102.

The broadcast frame 200 comprises a frame header 210 and a plurality of sub-frames 220 (220A to 220K). In the broadcast information delivering system of the invention, different types or kinds of contents information are transmitted by using these sub-frames 220. In the example illustrated in the drawing, one broadcast frame 200 can service K kinds of contents information as the broadcast information. The kinds of the contents contained in the sub-frames 220A to 220K are indicated by the frame header 210.

A sub-frame header 221 is located at the leading part of each sub-frame 220 to indicate the start of the sub-frame and identifiers of the contents included in the sub-frames. A plurality of information packets 222 (222A to 222L) follow the sub-frame header 221. An ending flag 224 is located at the tail end of the sub-frame to indicate the end of the sub-frame 220. Each of the information packets 222 (222A to 222L) contains CRC (Cyclic Redundancy Check) code 223 (223A to 223L) in order to detect errors in each information packet.

Figure 4:
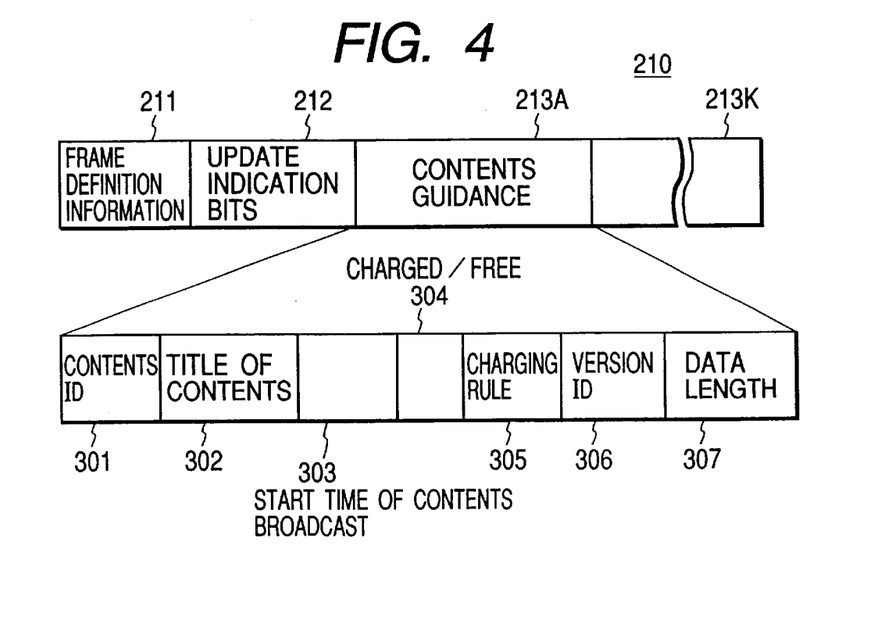
FIG. 4 is a chart illustrating an example of a construction of a header part of the broadcast frame.

The broadcast frame header 210 comprises, as shown in FIG. 4, a frame definition field 211, update indication bits field 212 for setting a bit pattern of a plurality of bits corresponding to the sub-frames 220A to 220K, a plurality of fixed lengths of contents guidance fields 213 (213A to 213K) corresponding to the sub-frames 220A to 220K. The frame definition field 211 includes the length of the frame header 210 and the definition information indicating the format of the frame header.

Each of the contents guidance fields 213 includes a contents identifier 301 for identifying the contents of the sub-frame 220 corresponding to the contents guidance field 213, the title of the contents 302, broadcast start time 303 of the contents information, fee indication 304 to indicate whether the contents information is charged or free of charge, a charging rule 305 in case of charged contents, a version identifier 306 of the contents information, and the data length 307 of the contents.

The charging rule 305 indicates, for example, the utility rate and the expiration date of a decipher key required for deciphering an enciphered charged contents information. A terminal apparatus, in which the term of validity for the currently holding decipher key has expired, requests the contents provider system 10 to supply a new decipher key. Upon receiving the request for a new decipher key specified by the contents ID from the terminal apparatus, the contents provider system 10 charges the terminal apparatus for the information service charge for a period from the date of request until the expiration date of the decipher key.

The broadcast start time 303 indicates the broadcast start time of the sub-frame 220 corresponding to the contents guidance 213. If this time is designated by a system clock inherent to the cellular system, it will be easy to synchronize the base station BS with the mobile station for receiving the broadcast frames.

The version identifier 306 takes on, for example, the time and date of the first broadcasting of updated contents information. Whether the contents information is updated or not is also determined based on the update indication bit pattern 212. However, if the version identifier of the already acquired contents is compared with the version identifier 306 indicated by the frame header 210, each time the terminal receives the broadcast frame header 210, the terminal can also recognizes whether the reserved contents information of the current broadcast frame has been already received.

Figure 5:
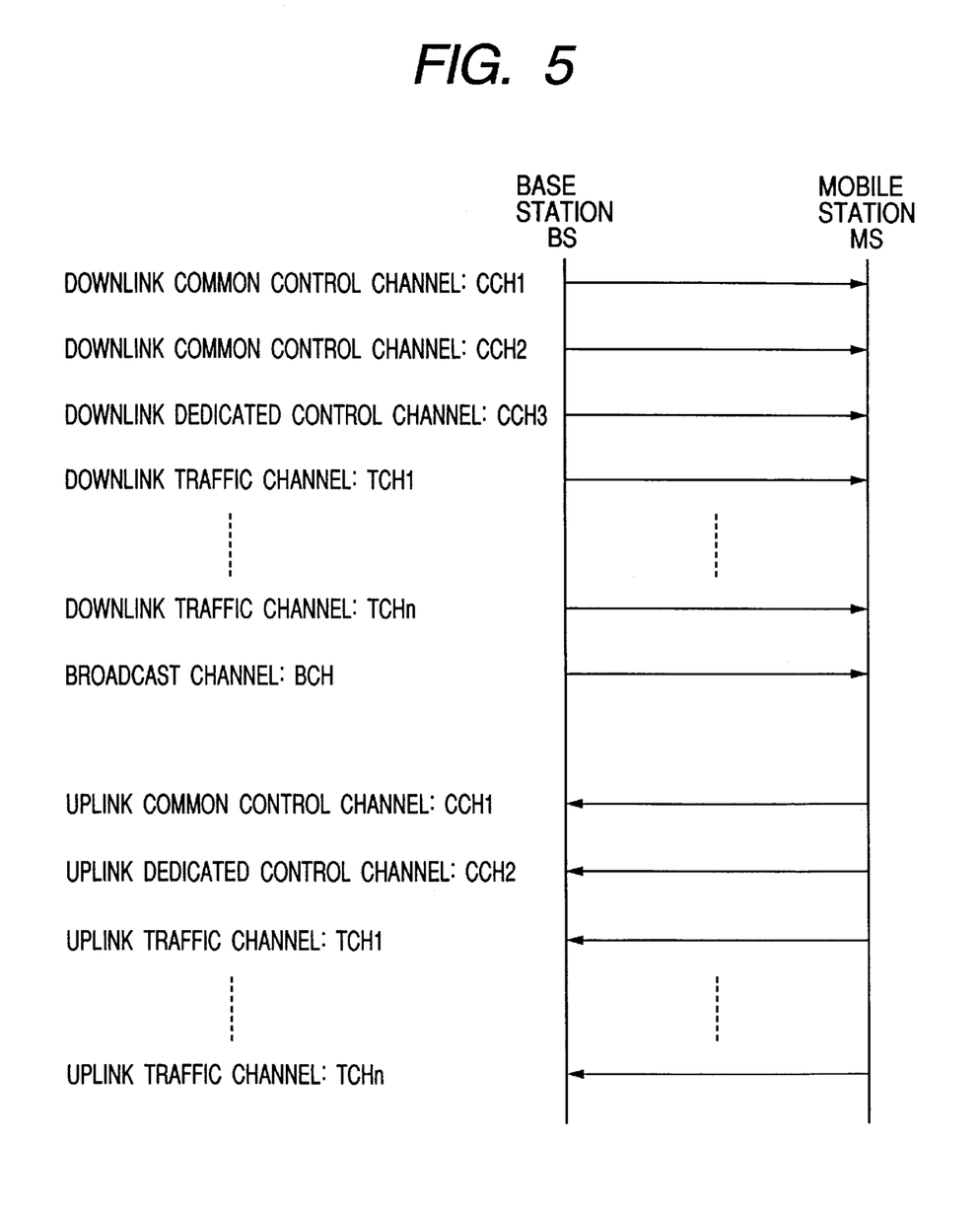
FIG. 5 is a chart illustrating a construction of a radio channel formed between a base station and a mobile station, in an embodiment of the broadcast information delivering system according to the invention.

FIG. 5 illustrates a construction of radio channels formed between the base station BS and the mobile station 60. In the cellular system of the CDMA (Code Division Multiple Access) system, between the base station BS and each mobile station 60, three control channels and one traffic channel for transmitting the user information are used as downlink channels toward the mobile station from the base station, and two control channels and one traffic channel for transmitting the user information are used as uplink channels toward the base station from the mobile station.

In FIG. 5, a downlink common control channel CCH1 is used in order to transmit commonly to all the mobile stations the system information required for controlling the wireless system, such as cell information, synchronizing information, and a spreading code to be used in other control channels. The spreading code of the downlink common control channel CCH1 itself can be specified by a predetermined algorithm on the side of each mobile station. An uplink common control channel CCH1 is used to inform the base station of a call from a mobile station, which is used commonly by all the mobile stations.

A downlink common control channel CCH2 is used for a calling notification to a mobile station and an allocation control of a downlink dedicated control channel CCH3 to the mobile station. The downlink dedicated control channel CCH3 and an uplink dedicated control channel CCH2 are used for the transmission and reception of connection control information between the mobile station and the base station after a calling notification.

In addition to these control channels, the base station BS uses different 2n types of spreading codes to thereby form n traffic channels TCH1 to TCHn for the downlink and uplink, respectively, and assigns a pair of downlink and uplink traffic channels TCHi to a called mobile station or a calling mobile station.

The broadcast information delivering system of this embodiment adds a downlink broadcast channel BCH to the foregoing channel construction of the conventional cellular system, and broadcasts the broadcast frame 200 outputted by the communication provider system 20 by using this broadcast channel BCH. One of the spreading codes for the traffic channels TCH may be assigned to the broadcast channel.

The broadcast control information such as the spreading code used in the broadcast channel BCH and the broadcast start time of the broadcast frame 200 is transmitted as a part of the control frame 100 transmitted through the downlink common control channel CCH1, as shown in FIG. 2, so that each mobile station will be able to receive the broadcast frames from the broadcast channel BCH.

In the CDMA cellular system, the base station BS can form the broadcast channel BCH in a physical construction similar to the other traffic channels TCH, except that it does not need the power control, and each of the mobile stations can receive the broadcast channel BCH by the same receiver circuit as that of the traffic channel. In order to receive the broadcast frame 200 from the broadcast channel BCH while the user of a mobile station MS is communicating through the traffic channel, it is necessary to provide each mobile station with a receiver circuit dedicated to the common broadcast channel BCH, in addition to the receiver circuit for the traffic channel TCH. If the reception of the broadcast frame is allowed to discontinue while the user is in a communication status, the mobile station BS can receive the broadcast frame by the receiver circuit for the normal traffic channel by switching the spreading code.

Figure 6:
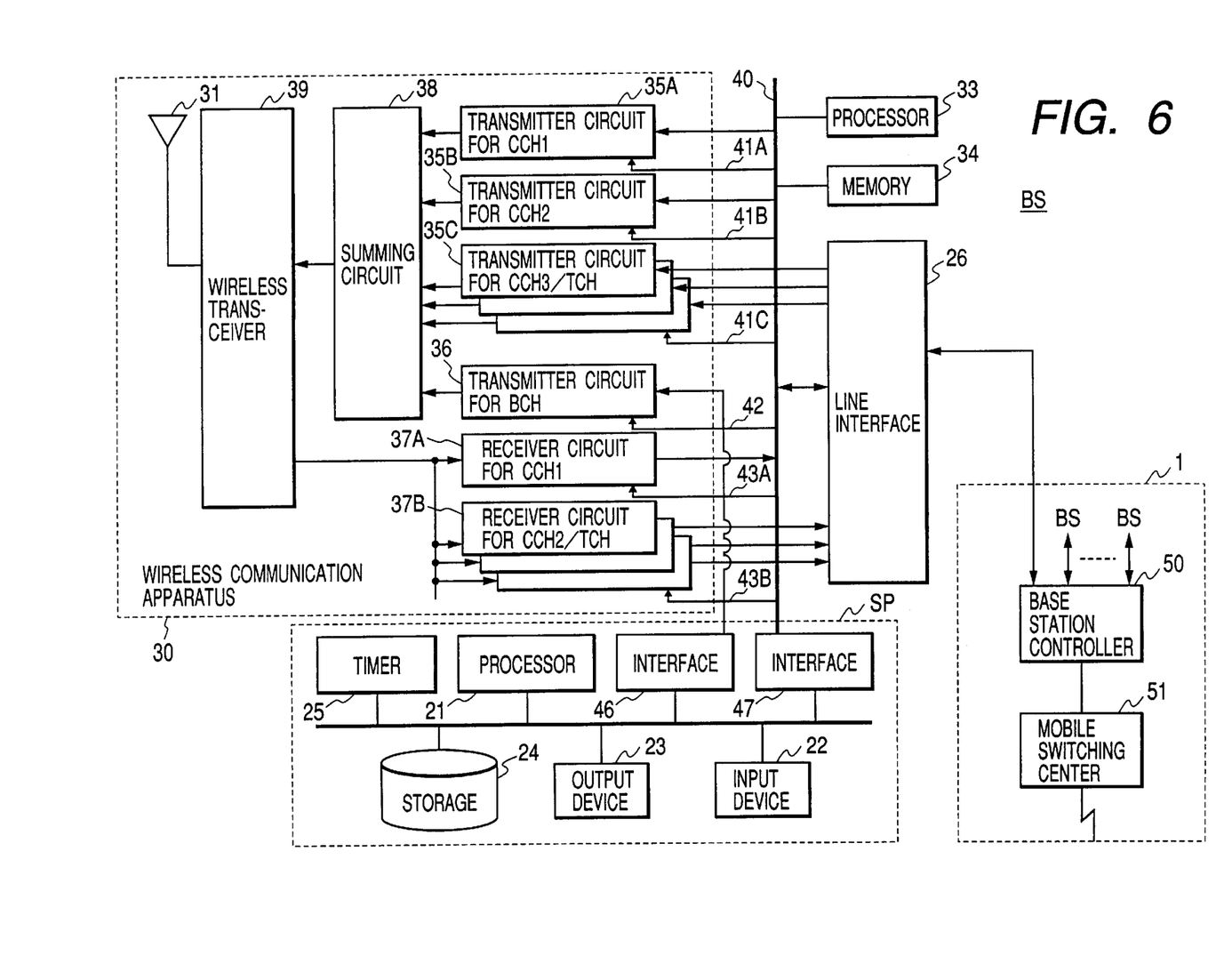
FIG. 6 is a block diagram illustrating an example of a construction of the base station.

FIG. 6 illustrates one embodiment of the wireless base station BS according to this invention which is provided with a function to transmit the broadcast frame 200 through the broadcast channel BCH.

The base station BS is comprised of an internal bus 40 connected to the wireless communication apparatus 30, a line interface 26 for communicating with a base station controller 50, a processor 33 for controlling the operation of the base station, and a memory 34 for storing various control programs and control data that the processor 33 requires.

Although the function of the communication provider system 20 shown in FIG. 1 may be implemented by the processor 33 constituting the base station, the embodiment in FIG. 6 includes a processor 21 for exclusively performing the function of the communication provider system 20 as shown by the block SP, in addition to the processor 33 for performing the general function for the base station BS. The contents information generated by the contents provider system 10 is transmitted to the base station controller 50 through a mobile switching center 51 from the communication network, and distributed to a plurality of the base stations BS by the base station controller 50. Each base station BS transfers the contents information to a storage 24 of the communication provider system SP through the line interface 26, the internal bus 40 and an interface 47.

The wireless communication apparatus 30 of each base station BS includes a plurality of transmitter circuits 35A to 35C and 36, and a plurality of receiver circuits 37A to 37B.

The transmitter circuit 35A is used for the downlink control channel CCH1, and the transmitter circuit 35B is used for the downlink control channel CCH2. These transmitter circuits receive the control information to be transmitted from the processor 33 connected through the internal bus 40. Here, signal lines 41A and 41B are control signal lines for designating the spreading codes to be used in the transmitter circuits 35A and 35B, respectively.

The transmitter circuit 35C is used for both the downlink dedicated control channel CCH3 and a traffic channel TCH, and a plurality of transmitter circuits 35C are prepared corresponding to a plurality of traffic channels. Each of these transmitter circuits 35C is switched into the traffic channel TCH from the downlink dedicated control channel CCH3 and vice versa, by a designation signal of the spreading code that the processor 33 outputs to the control signal line 41C through the internal bus 40. These transmitter circuits 35C are connected to a line interface 32. While used for the downlink dedicated control channel CCH3, these transmitter circuits 35C transmit connection control signals that the base station controller 50 or the mobile switching center 51 connected to the base station controller 50 generates, and while used for the traffic channel TCH, these transmitter circuits 35C transmit speech signals received from their talking partners via the base station controller 50.

The transmitter circuit 36 is used for the broadcast channel BCH, which is peculiar to this invention. Receiving a broadcast frame from the communication provider system SP, the transmitter circuit 36 transmits the broadcast frame in a form of a spread spectrum signal by code spreading the frame signal with the spreading code designated by the control signal line 42.

The spread spectrum signals outputted from the transmitter circuits 35A to 35C and the transmitter circuit 36 are synthesized by a summing circuit 38. The synthesized signal is superposed on a carrier signal of a specific frequency generated by a wireless transceiver 39 and transmitted out as a radio signal from an antenna 31.

On the other hand, a reception signal from the antenna 31 passes through the wireless transceiver 39 having the functions of carrier selection, frequency conversion, filtering, and analog to digital conversion, and thereafter enters into the receiver circuit 37A and a plurality of the receiver circuits 37B.

The receiver circuit 37A receives the control signal of the uplink common control channel CCH1, and transfers the received control signal to the processor 33 through the internal bus 40. Each of the receiver circuits 37B receives the control signal of the uplink dedicated control channel CCH2 and the signal of the traffic channel TCH, and transfers these received signals to the base station controller 50 through the line interface 32. The receiving channels for these receiver circuits 37A, 37B are specified by the designation signals of the spreading codes supplied to the signal lines 43A, 43B from the processor 33. Switching from the receiving channel CCH1 to TCH in the receiver circuit 38B is made by switching the spreading code used for the de-spreading.

The communication provider SP communicates with the base station processor 33 through the interface circuit 47 connected to the internal bus 40, and sends out the broadcast frames 200 to the broadcast channel transmitter circuit 36 through an interface circuit 46, respectively, in synchronization with the broadcasting time 103 of which the processor 33 informs the mobile stations through the downlink common control channel CCH1. If the length of the broadcast frame is variable, by adjusting the transmission interval between the current frame and a subsequent frame to periodically repeat the transmission of the broadcast frame at a specific frequency, it will facilitate the synchronization control between the processor 33 and the communication provider SP.

Figure 7:
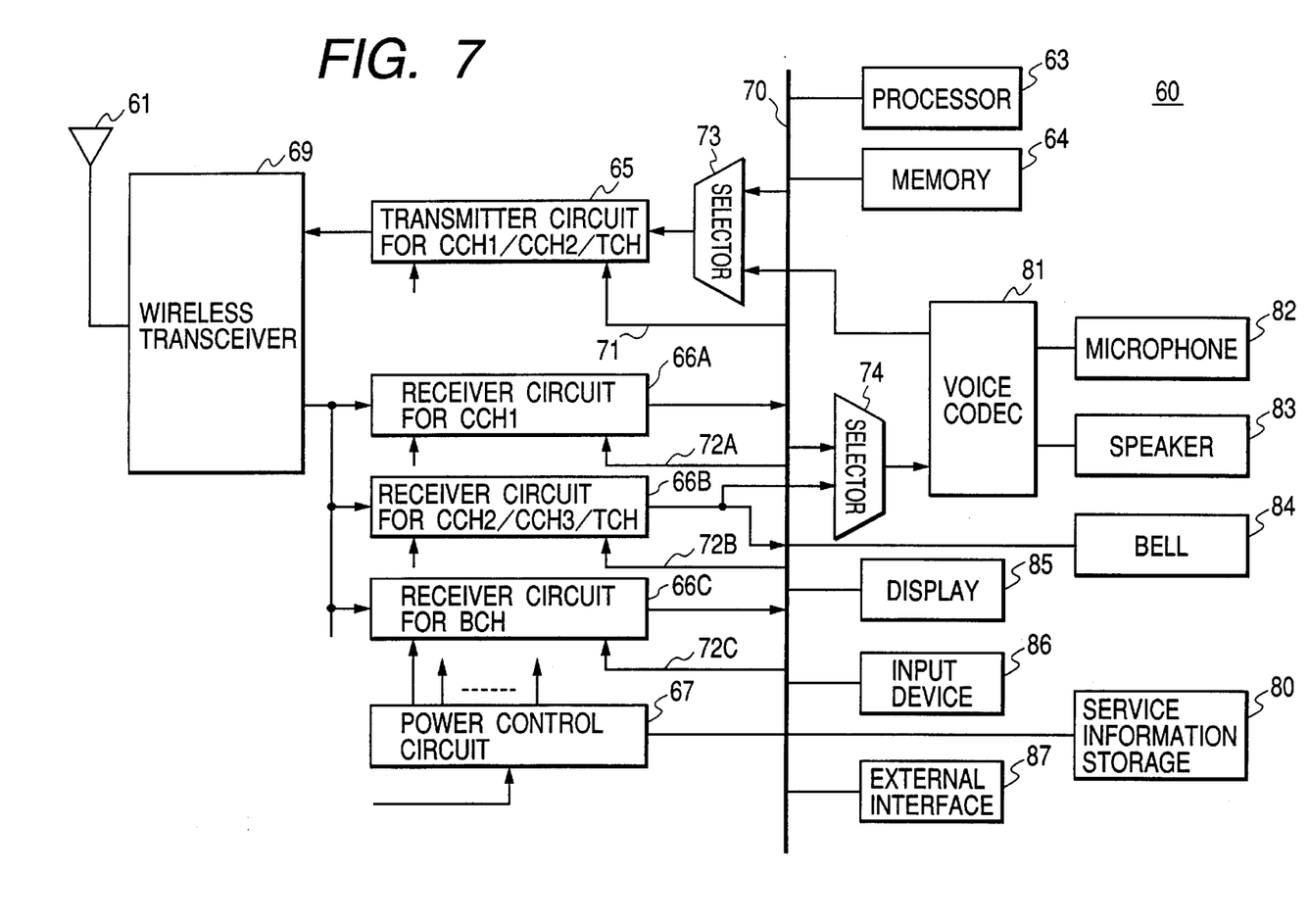
FIG. 7 is a block diagram illustrating an example of a construction of the mobile station.

FIG. 7 illustrates an example of a construction of the mobile station 60. The mobile station 60 is comprised of an internal bus 70 connected to a processor 63, a memory 64 for storing various programs and control data that the processor 63 requires, a transmitter circuit 65, a plurality of receiver circuits 66A to 66C, and a power supply control circuit 67.

The transmitter circuit 65 is commonly used for the uplink common control channel CCH1, the dedicated control channel CCH2, and the traffic channel TCH, and these channels are switched in accordance with the designation signals of the spreading codes supplied to a signal line 71 from the processor 63. While the transmitter circuit 65 is in operation for the control channel CCH1 or CCH2, the control information outputted to the internal bus 70 from the processor 63 is supplied to the transmitter circuit 65 through a selector 73. While the transmitter circuit 65 is in operation for the traffic channel TCH, a voice signal inputted from a microphone 82 is supplied to the transmitter circuit 65 through a voice CODEC circuit 81 and the selector 73. The transmitter circuit 65 outputs transmission signals with different spread spectra in time sequentially in accordance with the switching of the channels. The output signal of the transmitter circuit 65 is superposed on a carrier signal of a specific frequency by a wireless transceiver 69, and transmitted as a radio signal from an antenna 61.

The receiver circuit 66A is dedicated to the downlink common control channel CCH1, the receiver circuit 66B is shared by the common control channel CCH2, the dedicated control channel CCH3, and the traffic channel TCH, and the receiver circuit 66C is dedicated to the broadcast channel BCH. These receiver circuits select the receiving channels in accordance with the designation signals of the de-spreading codes supplied to signal lines 72A, 72B and 72C.

The output signal from the receiver circuit 66A is taken into the processor 63 through the internal bus 70. The output signal from the receiver circuit 66B is taken in the processor 63 through the internal bus 40 while the receiver circuit is in operation for the control channel, and the output signal is supplied to the voice CODEC 81 through a selector 74 while the receiver circuit is in operation for the traffic channel. The decoded voice signal is outputted to a speaker 83. The broadcast information selectively received by the receiver circuit 66C is stored in service information storage 80 through the internal bus 70.

The mobile station 60 is provided with, as a user interface, a bell 84 to notify a calling, a display 85 for displaying character information, an input device 86 including the ten keys and other function keys, and an external interface circuit 87 for connecting an external storage or computer. The service information storage 80 for storing the broadcast information is made of a comparatively large capacity memory such as a flash memory and the like. The broadcast information read out from the service information storage 80 is outputted to the voice CODEC 81 or the display 85 through the internal bus 70.

The power supply control circuit 67 operates to selectively control the supply of the power source voltage to the various circuits of the mobile station 60. In order to reduce the exhaustion of the battery as much as possible while a mobile station is in a waiting state, the power supply control circuit 67 halts the power supply to the circuits other than the essential components such as the processor 63 and the transmitter and receiver circuits for the common control channels. As described later, the power supply control circuit 67 halts the power supply to the receiver circuit 66C for the broadcast channel, except for the reception period of the frame header 210 and a specific sub-frame including a broadcast contents information reserved by the user.

Figure 8:
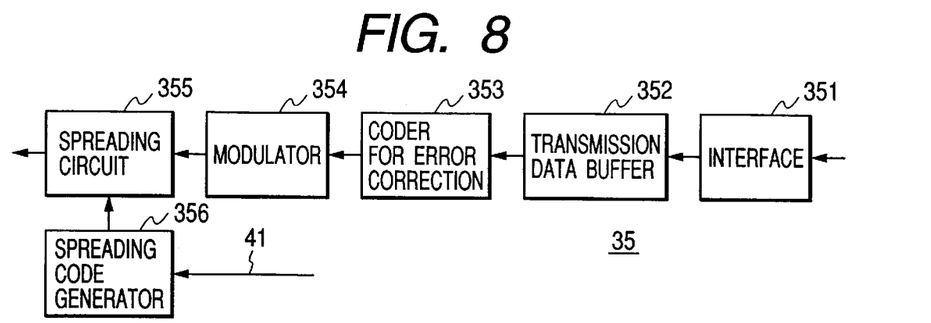
FIG. 8 is a block diagram illustrating the detail of a transmitting circuit of the base station.

FIG. 8 illustrates a basic construction of the transmitter circuit 35 included in the wireless communication apparatus 30 of the base station. The construction of the transmitter circuits 36 in the base station and the transmitter circuit 65 in the mobile station 60 are the same in essential as this.

Transmission information inputted to an interface circuit 351 is supplied to an error correction coder 353 through a transmission data buffer memory 352. The error correction coder 353 is comprised of an interleaver, and a turbo coder or a convolutional coder. The transmission signal applied error correction code by the error correction coder 353 is inputted to a modulation circuit 354, and a modulated transmission signal obtained by a predetermined modulation processing is inputted to a code spreading circuit 355. The code spreading circuit 355 applies code spreading to the input signal with the spreading code supplied from a spreading code generator 356, thereby to output a spread spectrum signal to the wireless transceiver 39. The spreading code generator 356 supplies the code spreading circuit 355 with a spreading code specified in accordance with the designation signal of the spreading code that the processor outputs to the signal line 41.

Figure 9:
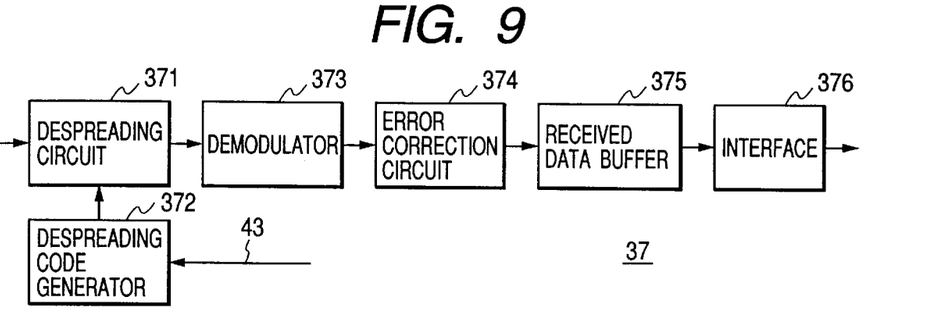
FIG. 9 is a block diagram illustrating the detail of a receiver circuit of the base station.

FIG. 9 illustrates a basic construction of the receiver circuit 37 in the wireless communication apparatus 30 of the base station. The receiver circuits 66 in the mobile station 60 also have the same construction in essentially as this.

The reception signal from the wireless transceiver 39 is inputted to a code despreading circuit 371. The code de-spreading circuit 371 applies code despreading to the input signal with a de-spreading code supplied from a despreading code generator 372, thereby to output a despread spectrum signal to a demodulation circuit 373. The despreading code is specified in accordance with the designation signal of a despreading code supplied from the signal line 43. A demodulated reception signal having been subjected to a specific demodulation processing by the demodulation circuit 373 is supplied to an error correction decoder 374 in order to apply an error correction processing thereon, and thereafter temporarily stored in a received data buffer memory 375 and delivered to the internal bus 40 through an interface circuit 376. The error correction decoder 374 is comprised of a de-interleaver, and a turbo decoder or a Viterbi decoder.

Figure 10:
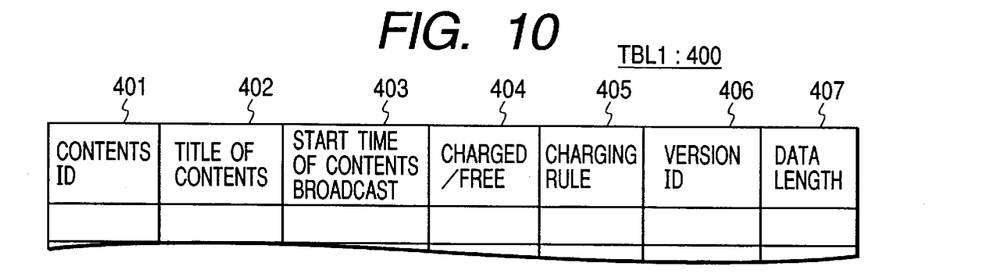
FIG. 10 is a chart illustrating an example of a contents guidance table formed at the mobile station.

FIG. 10 illustrates a construction of a contents guidance table (TBL1) 400 formed by the mobile station 60 during the receiving of the broadcast frame header 210.

The contents guidance table 400 is composed of a plurality of records corresponding to the contents guidance fields 213A to 213K of the broadcast frame header 210. Each of the records includes a plurality of data items 401 to 407 corresponding to the data items 301 to 307 in the contents guidance fields 213.

Figure 11:
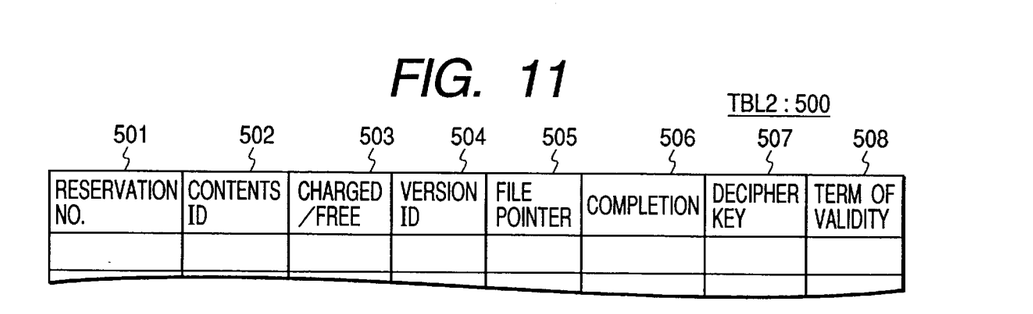
FIG. 11 is a chart illustrating an example of a contents reservation table formed at the mobile station.

FIG. 11 illustrates a construction of a contents reservation table (program reservation table TBL2) 500 formed by the mobile station 60.

The contents reservation table 500 is formed in response to user's operations for a reservation on the mobile station, and the table is composed of at least one record corresponding to the reserved broadcast contents information.

Each record includes a reservation number 501, contents ID 502, charged/free indication 503, version identifier 504, file pointer (or file name) 505 for reading out the contents information stored in the storage 80, completion indication 506 for indicating whether or not the contents has been be received without errors, decipher key 507 necessary to decipher the enciphered contents, and term of validity 508 of the decipher key. The entity of the decipher key may be stored in another storage area. In this case, the filed 507 includes a pointer for reading out the decipher key from the storage area.

Among these items, the data of the items 501 to 503 are copied from the service guidance table 400 when the user made a reservation, and the data of the other items are set when the mobile station received the target contents information from the broadcast channel BCH.

Figure 12:
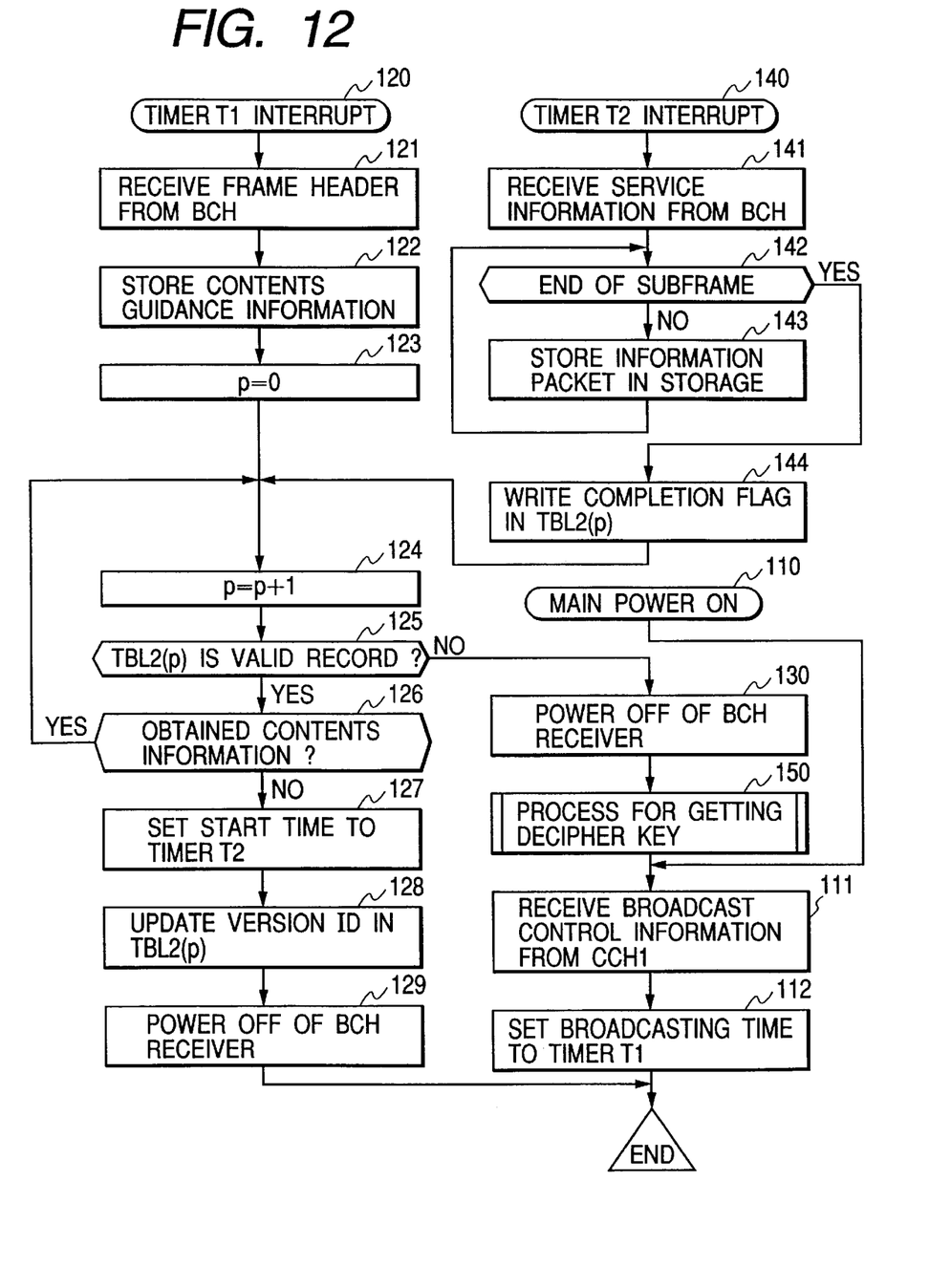
FIG. 12 is a flow chart illustrating an embodiment of a program executed by the mobile station for receiving the broadcast information.

FIG. 12 illustrates a flow chart of broadcast information receiving program executed by the processor 63 of the mobile station 60.

When the main power supply of the mobile station 60 is turned ON (step 110), the broadcast control information is extracted from the control frame 100 received from the common control channel CCH1 by the receiver circuit 66A (step 111), then the broadcasting time 103 is set in the timer T1 (step 112).

When the interruption 120 of the timer T1 occurs at the broadcasting time, the receiver circuit 66C for the broadcast channel BCH is activated to receive the frame header 210 of the broadcast frame (step 121). Then the contents guidance table (TBL1) 400 as shown in FIG. 10 is formed in accordance with the contents guidance 213 contained in the frame header (step 122).

Next, after the value of a parameter p for designating a record of the reservation table (TBL2) 500 is set to an initial value 0 (step 123), the value of the parameter p is incremented (step 124), and thereafter is determined whether there is a valid reservation data in the p-th record TBL2(p) of the reservation table 500 (step 125). If a valid reservation data is present, whether the reserved contents are already obtained is determined (step 126). The determination is carried out in such a manner that the version identifier 504 contained in the reservation record TBL2(p) is compared with the version identifier 406 of a record TBL1(j) in the contents guidance table 400 which has the same contents ID as the reservation record TBL2(p), and the completion indication 506 of the reservation record TBL2(p) is checked.

If both the version identifiers of the reservation record TBL2(p) and the guidance record TBL1(j) coincide with each other and a completion flag is set in the completion indication 506, it means that the target contents has been already procured. In this case, the process returns to the step 124 to repeat the above determination on the next reservation record.

If both of the version identifiers do not coincide with each other, or if a completion flag is not yet set in the completion indication 506, the broadcast start time 403 of the guidance record TBL1(j) is set to the timer T2 (step 127), the version identifier 406 of the guidance record TBL1(j) is written in the version identifier 504 of the reservation record TBL2(p), the completion indication 506 is cleared (step 128), and thereafter the power supply to the broadcast channel receiver circuit 66C is stopped to wait for the timer T2 interruption (step 129).

At the step 125, if a valid reservation data is not present in the reservation record TBL2(p), the power supply to the broadcast channel receiver circuit 66C is stopped (step 130) because there is not any further necessity to continue the reception through the current broadcast frame. In this case, after executing the decipher key procurement routine described later (step 150), the foregoing receiving steps 111, 112 of the broadcast control information are executed.

When the interruption 140 of the timer T2 occurs, the broadcast channel receiver circuit 66C is activated again, and the reception of the sub-frame 220 including the information packet of the target contents corresponding to the reservation record TBL2(p) is started (step 141). The received information packets 222 are sequentially stored in the storage 80 (step 143). If the ending flag 224 of the sub-frame is detected (step 142), the file pointer 505 is set in the reservation record TBL2(p) and the completion flag is set in the completion indication 506 (step 145), and thereafter, the process returns to the step 124 to repeat the foregoing operations on the next reservation record. Here, if an un-correctable error occurs in the received packet, the flag is not set in the completion indication 506 in order to receive the failed contents in the subsequent frame.

Through the above program operations, each time when the base station BS transmits a new broadcast frame 200 to the broadcast channel BCH, each mobile station 60 can receive the contents guidance information upon the interruption of the timer T1, and selectively receive the target contents information upon the interruption of the timer T2.

Even in a case where the rate of the target broadcast information occupying in the total length of the broadcast frame is extremely low, by selectively stopping the power supply to the broadcast channel receiver circuit 66C during the transmission period of unnecessary information, each mobile station can procure the latest broadcast information received by the user desires in the storage 80 restraining the exhaustion of the battery.

Figure 13:
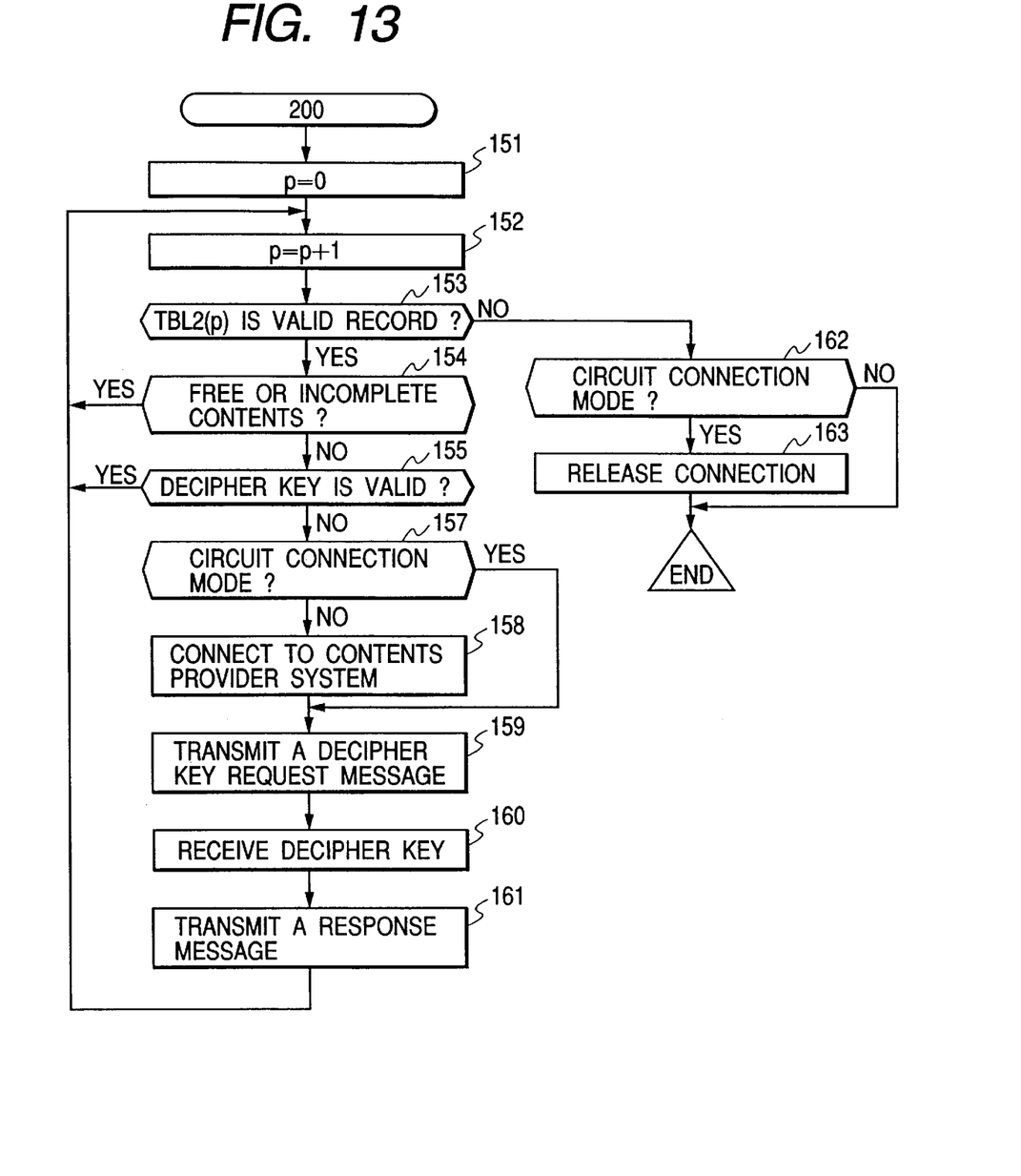
FIG. 13 is a flow chart to detail a decipher key acquisition routine 150 in the program in FIG. 12.

FIG. 13 illustrates a detailed flow chart of the decipher key procurement routine 150.

This routine is to procure the decipher key from the contents provider system 10, in case the contents completed to receive are enciphered charged contents.

After the parameter p for specifying a record of the reservation table 500 is initialized (step 151), the value of the parameter p is incremented (step 152), and thereafter is determined whether there is a valid reservation data in the p-th reservation record TBL2(p) (step 153). If a valid reservation data is present, the charged/free indication 502 and the completion indication 506 are determined (step 154). If the reserved contents are free for charge, or if not properly received, the process returns to the step 152 to repeat the above determination on the next reservation record.

If the charged contents are properly received, the term of validity 508 of the decipher key in the reservation record TBL2(p) is checked (step 155). If the term of validity of the decipher key is not expired, the process returns to the step 152 to repeat the above determination on the next reservation record. If the term of validity of the decipher key is expired, or if the data is not yet set in the term of validity 508, it is necessary to get a new decipher key from the contents provider system 10.

In this case, first, a check is made as to whether the communication circuit between the contents provider system 10 and the mobile station is already connected (step 157); and if the circuit is not yet connected, the telephone number stored in advance is automatically called in order to connected with the contents provider system 10 through a general cellular communication circuit (step 158). After the connection of the circuit is confirmed by a response from the contents provider system 10, a decipher key request message including the contents ID 502 and the terminal identifier, for example, the telephone number of the mobile station is transmitted (step 159). When a message containing the decipher key is received from the contents provider system, the received decipher key data is stored as the decipher key 507 in the reservation record TBL2(p) (step 160), a response message to indicate that the decipher key was received is transmitted (step 161), and thereafter the process returns to the step 152. If the decipher key was not normally received, the decipher key request message is transmitted again.

If the reservation record TBL2 (p) has no reservation data at the step 153, whether the communication circuit is in connection mode or not is checked (step 162). If the circuit is in connection mode, after the circuit is disconnected (step 163), this routine is terminated. Upon receiving the response message from the mobile station 60 at the step 161, the contents provider system calculates the utility fee of the contents information from the date of the message received until the expiration date of the decipher key, and charges the utility fee to the user (telephone number of the mobile station) that originated the request.

Figure 14:
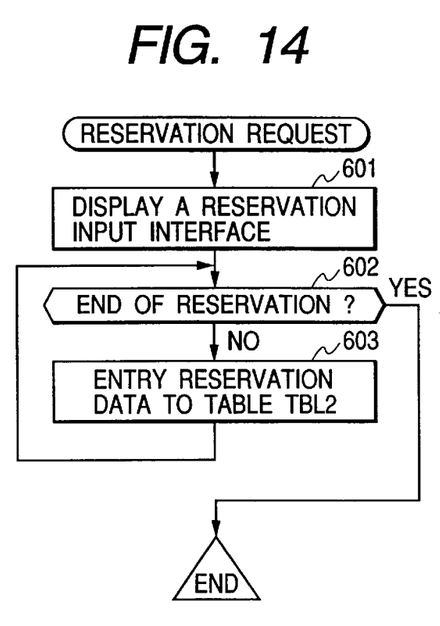
FIG. 14 is a flow chart illustrating an embodiment of a program executed by the mobile station in response to a contents reservation request from a user.

FIG. 14 illustrates a flow chart of a program that the mobile station 60 executes in response to a contents reservation request from a user.

When the contents reservation request is received from an input device 86, a reservation input interface view is presented on the display 85 by referring to the contents guidance table 400(step 601).

As necessary information for a user to select a desired contents, the reservation input interface view presents a plurality of entries each comprising, for example, a contents ID 401, title of contents 402, charged/free indication 403, and charging rule 405 defined in the contents guidance table 400. If a reservation record is already registered in the reservation table 500, a mark is displayed in association with an entry corresponding to the reservation record to indicate that the contents was already reserved. Since a small mobile station has a restricted size of display area, it is preferable to make the interface view so as to sequentially scroll the contents of said respective entries.

During the presentation of the reservation input interface view, if the user operates to select the entry of the desired contents, the reservation record corresponding to this entry is registered in the reservation table 500 (step 603). If the user designates the termination of the reserving operation (step 602), this routine is closed.

Figure 15:
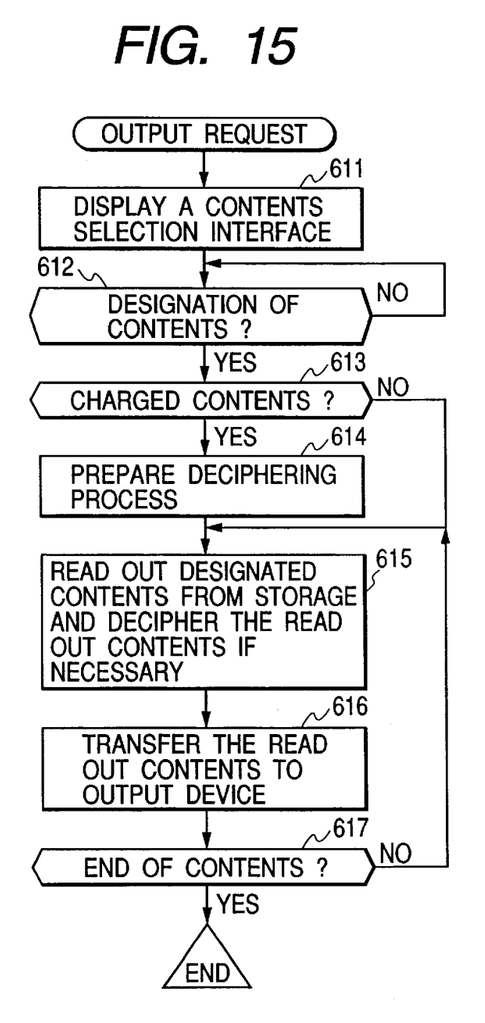
FIG. 15 is a flow chart illustrating an embodiment of a program executed by the mobile station in response to a request from a user for outputting broadcast information.

FIG. 15 illustrates a flow chart of a program that the mobile station 60 executes in response to a broadcast information output request from a user.

When the broadcast information output request is received from the input device 86, a contents selection interface view is presented on the display 85 (step 611), and the process waits for the user's operation to specify the contents (step 612). The contents selection interface view presents, for example, the title of contents 402 which is read out from the guidance table 400 in correspondence with each reservation record of the reservation table 500.

During the presentation of the contents selection interface view, if the user operates to select one of the contents, a check is made as to whether the selected contents are charged contents or not (step 613). If charged contents was selected, the decipher key 508 corresponding to the contents is read out, and the preparation for deciphering is made (step 614). Next, on the basis of the file pointer 504 stored in the reservation table 500, the processor 63 starts to reads out the target contents information from the storage 80 to sequentially output to the output device (step 615 to 616). If the target information is enciphered one, the contents data read out from the storage 80 is sequentially deciphered and transferred to the output device. The contents is repeatedly transferred to the output device, until all the target contents information are completely read out from the storage (step 617).

In the embodiment shown in FIG. 6, the communication provider SP is comprised of the processor 21 independent of the processor 33 for the base station BS. However, if the functions of both the communication provider and the base station are desired to be implemented by a single processor 33, the storage 24 may be connected to the internal bus 40 so that the processor 33 reads out the broadcast frame from the storage 24 and supplies the broadcast channel transmitter circuit 36 with this broadcast frame through the internal bus 40.

Although each wireless base station BS is equipped with the communication provider function SP in the embodiment, the communication provider function may be installed in the base station controller 50. In this case, the base station controller 50 distributes the same broadcast frame to a plurality of base stations BS, and each of the base stations sends out the broadcast frame received as one of the user traffics to the broadcast channel transmitter circuit 36. The base station BS also transmits the broadcasting time of the broadcast frame which may be notified by the base station controller 50 as a part of the control information contained in the common control frame.

As understood from the above description, according to the invention, since plural kinds of broadcast information are transmitted through the broadcast channel from the base stations BS of the wireless communication system, it is possible to provide each user of the wireless terminal or the mobile station with the broadcast information easily and inexpensively.

Further, according to the invention, since the broadcast contents guidance and the broadcasting time are broadcast in advance, the terminal apparatus can selectively activate the receiver circuit during the broadcasting period of a specific contents information that the user reserved, and store the received information. Therefore, the period of the reception mode to procure the broadcast information is limited and the exhaustion of the battery can be restrained.

According to the invention, each terminal apparatus can automatically store the broadcast information reserved by the user in the storage whenever the contents are updated, and it can output the broadcast information in response to the user's request. Therefore, the terminal user is able to refer to the desired broadcast information at a timing convenient to the user.

Further, by providing each terminal with a function to automatically execute a communication procedure for communicating with the information service system through a general traffic channel when the decipher key is needed, the information service system is possible to broadcast the charged information in the form of enciphered data. In this case, the information service system can securely collect the utility fee of the broadcast information by charging the utility fee to the user whose terminal has originated the request of the decipher key, upon the completion of the communication procedure.

What is claimed is:

1. A broadcast information delivering system including at least one wireless base station that communicates with wireless terminals control information through at least one control channel and user information through traffic channels assigned to each of said wireless terminals, said wireless base station comprising:

a control channel transmitter circuit for transmitting system information and broadcast information to the control channel, said broadcast control information defining a transmission condition of a broadcast frame;

a plurality of traffic channel transmitter circuits for transmitting user information to respective traffic channels; and a broadcast channel transmitter circuit for transmitting the broadcast frame, which contains broadcast information to be delivered to unspecified wireless terminals, to a specific channel defined by said broadcast control information in accordance with said transmission condition, wherein said broadcast frame comprises a frame header and a plurality of sub-frames following the frame header, each of said sub-frames containing different broadcast information to each other, and said frame header including guidance information concerning the broadcast information contained in the sub-frames, wherein said guidance information includes classification information for indicating the kind of the broadcast information contained in each of said sub-frames and time information for indicating a transmission time of each of said sub-frames, as said guidance information, wherein each wireless terminal comprises:

a control channel receiver circuit for receiving the control information from said control channel, a broadcast channel receiver circuit for receiving the broadcast frame from said broadcast channel based on the broadcast control information received by said control channel receiver circuit, and for selectively receiving broadcast information contained in a specific one of said sub-frames in accordance with guidance information of the broadcast frame, an input device for designating one of the broadcast information, and a power supply controller for halting the power supply to said broadcast channel receiver circuit for a period after receiving the frame header of said broadcast frame until the transmission timing of a sub-frame which includes said designated one of the broadcast information.

2. A broadcast information delivering system according to claim 1, wherein said broadcast control information includes information indicating a transmission time of the broadcast frame as said transmission condition.

3. A broadcast information delivering system according to claim 1, wherein said broadcast control information includes information for designating said specific channel to be used as a broadcast channel and information for indicating a transmission time of the broadcast frame to be transmitted to the broadcast channel, as said transmission condition.

4. A broadcast information delivering system according to claim 1, wherein each of said sub-frames comprises a sub-frame header and a plurality of information packets each including a block of broadcast information.

5. A broadcast communication system according to claim 1, wherein the power supply controller is provided with a function to automatically activate said broadcast channel receiver circuit in accordance with a transmission time of a subsequent frame, said transmission time being indicated in the broadcast control information received by said control channel receiver circuit.

6. A broadcast information delivering system comprising:

a provider for generating a broadcast frame containing a frame header and a plurality of sub-frames following the frame header, each of said sub-frames containing different broadcast information to each other, and said frame header including guidance information of the broadcast information contained in said sub-frames; and a wireless base station for communicating with a wireless terminal, control information through at least one control channel in each of uplink and downlink directions, and user information through a pair of uplink and downlink traffic channels assigned to the wireless terminal, wherein said wireless base station comprises:

a control channel transmitter circuit for transmitting system information and broadcast control information to said downlink control channel, said broadcast control information defining a transmission condition of a broadcast frame, and a broadcast channel transmitter circuit for transmitting the broadcast generated by said provided to a specific channel defined by said broadcast control information, in accordance with said transmission condition, wherein said broadcast control information includes information for specifying said specific channel and information for indicating a transmission time of said broadcast frame, as said transmission condition, wherein said frame header includes classification information for indicating a category of the broadcast information contained in each of said the sub-frames and time information for indicating a transmission timing of each of said sub-frames, as said guidance information, and wherein each wireless terminal comprises:
 a control channel receiver circuit for receiving the control information from said control channel,
 a broadcast channel receiver circuit for receiving the broadcast frame from said broadcast channel based on the broadcast control information received by said control channel receiver circuit, and for selectively receiving broadcast information contained in a specific one of said sub-frames in accordance with guidance information of the broadcast frame,
 an input device for designating one of the broadcast information, and
 a power supply controller for halting the power supply to said broadcast channel receiver circuit for a period after receiving the frame header of said broadcast frame until the transmission timing of a sub-frame which includes said designated one of the broadcast information.

7. A broadcast communication system according to claim 6, wherein the power supply controller is provided with a function to automatically activate said broadcast channel receiver circuit in accordance with a transmission time of a subsequent frame, said transmission time being indicated in the broadcast control information received by said control channel receiver circuit.

8. A broadcast communication system for communicating between a wireless base station and one of a plurality of wireless terminals, control information through at least one control channel and user information through a pair of uplink and downlink traffic channels assigned to each of said wireless terminals, said wireless base station comprising:
 a control channel transmitter circuit for
 transmitting to said control channel, broadcast control information for defining a transmission condition of a broadcast frame; and
 a broadcast channel transmitter circuit for transmitting the broadcast frame, which is supplied from a broadcast information supplying system to deliver to unspecified wireless terminals, in accordance with said transmission condition to a broadcast channel which is also specified by said transmission condition, said broadcast frame comprising a frame header and a plurality of sub-frames following the frame header, each of said sub-frames containing different broadcast information to each other, and said frame header including guidance information concerning the broadcast information contained in said respective sub-frames, wherein each wireless terminal comprises:
 a control channel receiver circuit for receiving the control information from said control channel,
 a broadcast channel receiver circuit for receiving the broadcast frame from said broadcast channel based on the broadcast control information received by said control channel receiver circuit, and for selectively receiving broadcast information contained in a specific one of said sub-frames in accordance with guidance information of the broadcast frame, a storage for storing the broadcast information received by said broadcast channel receiver circuit,
 an output device for outputting the broadcast information stored in said storage,
 wherein said frame header of the broadcast frame includes, as the guidance information, identification information for identifying the broadcast information contained in each of said sub-frames, and time information for indicating a transmission timing of said respective sub-frames,
 an input device for designating one of the broadcast information, and
 a power supply controller for halting the power supply to said broadcast channel receiver circuit for a period after receiving the frame header of said broadcast frame until the transmission timing of a sub-frame which includes said designated one of the broadcast information.

9. A broadcast communication system according to claim 8, wherein the power supply controller is provided with a function to automatically activate said broadcast channel receiver circuit in accordance with a transmission time of a subsequent frame, said transmission time being indicated in the broadcast control information received by said control channel receiver channel.

10. A broadcast communication system according to claim 8, wherein each of the wireless terminals further comprises means for automatically communicating with said broadcast information supplying system to get a decipher key for use in deciphering of broadcast information if the broadcast information received by the broadcast channel receiver circuit is enciphered one.

11. A wireless terminal apparatus that communicates with a wireless base station, control information through at least one control channel and user information through a pair of uplink and downlink traffic channels assigned thereto, said wireless terminal apparatus comprising:
 a control channel receiver circuit for receiving the control information from said control channel;
 a broadcast frame from a broadcast channel specified by broadcast control information received by said control channel receiver circuit, and selectively receiving broadcast information contained in a specific one of sub-frames in the broadcast frame in accordance with guidance information contained in the broadcast frame;
 a storage for storing the broadcast information received by said broadcast channel receiver circuit;
 an output device for outputting the broadcast information stored in the said storage,
 wherein the frame header of said broadcast frame includes as the guidance information, identification information for identifying the broadcast information contained in each of said sub-frames, and time information for indicating a transmission timing of each of said sub-frames,
 an input device for designating one of said broadcast information to be received; and
 a power supply controller for halting the power supply to said broadcast channel receiver circuit for a period after receiving a frame header of the broadcast frame until the transmission timing of specified one of said sub-frames which contains the designated broadcast information.

* * * * *